(12) United States Patent
Catalan et al.

(10) Patent No.: US 6,796,241 B2
(45) Date of Patent: Sep. 28, 2004

(54) METHOD AND APPARATUS FOR PRODUCING IMAGES ON EGGS

(75) Inventors: Jose Luis Catalan, Rio de Janeiro (BR); Ricardo Vazquez, Buenos Aires (AR)

(73) Assignee: José Luis Catalán, Buenos Aires (AR)

( * ) Notice: Subject to any disclaimer, the term of this patent is extended or adjusted under 35 U.S.C. 154(b) by 0 days.

(21) Appl. No.: 10/446,409

(22) Filed: May 28, 2003

(65) Prior Publication Data

US 2004/0000245 A1 Jan. 1, 2004

Related U.S. Application Data

(63) Continuation-in-part of application No. 10/215,750, filed on Aug. 9, 2002.
(60) Provisional application No. 60/384,492, filed on May 31, 2002.

(51) Int. Cl.⁷ .................................................. B41F 1/16
(52) U.S. Cl. ..................... 101/492; 101/41; 101/485; 426/383
(58) Field of Search ............................ 101/35, 41, 42, 101/43, 44, 483, 485, 486, 492; 209/643, 701; 414/781, 782, 783, 798.4, 798.9; 426/383

(56) References Cited

U.S. PATENT DOCUMENTS

| | | |
|---|---|---|
| 1,611,679 A | 12/1926 | Rees |
| 1,906,094 A | 4/1933 | Powell |
| 3,094,920 A | 6/1963 | Priesmeyer |
| 3,389,654 A | 6/1968 | Hirt |
| 3,779,159 A | 12/1973 | Rose et al. |
| 3,848,564 A | 11/1974 | Kull |
| 4,079,845 A * | 3/1978 | Warren ................... 414/796.3 |
| 4,355,936 A * | 10/1982 | Thomas et al. .......... 414/796.2 |
| 4,411,574 A * | 10/1983 | Riley ....................... 414/796.3 |
| 4,531,475 A | 7/1985 | Thill |
| 4,843,958 A * | 7/1989 | Egosi ............................ 101/2 |
| 4,967,687 A | 11/1990 | McShane |
| 5,063,871 A | 11/1991 | Chambers |
| 5,142,976 A * | 9/1992 | Roulleau ..................... 101/41 |
| 5,164,009 A | 11/1992 | Chandler |
| 5,565,229 A | 10/1996 | Mandle |
| 5,693,352 A | 12/1997 | Vogel Goodman |
| 5,895,679 A | 4/1999 | Pender et al. |
| 2002/0150460 A1 * | 10/2002 | Chalker et al. ............. 414/781 |

FOREIGN PATENT DOCUMENTS

DE 3836142 A1 * 4/1990 ........... B41F/17/00

* cited by examiner

Primary Examiner—Ren Yan
(74) Attorney, Agent, or Firm—Robert A. Seldon

(57) ABSTRACT

This invention relates to a method and apparatus for distributing mass copies of text and/or images on a novel medium, namely eggs, by using the eggshell of the egg as an advertising or message-bearing medium. Mass quantities of eggs are imprinted with a promotional image prior to distributing said eggs to consumers. The promotional image can be, for indicative of a modification to the egg's content, or consist of warnings or instructions pertaining to security or emergency matters. The shells of the eggs are imprinted by a method comprising the steps of (1) repeatedly transferring one row of eggs at a time from a carton having M rows of N eggs to N empty egg-receiving cradles until all the eggs in the carton has been transferred, moving the cradles through a number of imprinting stations, imprinting N eggs at each such station with N tampons, and transferring N imprinted eggs at a time into each of the M rows in the cartons.

6 Claims, 5 Drawing Sheets

METHOD AND APPARATUS FOR PRODUCING IMAGES ON EGGS

PRIORITY CLAIM

Priority of U.S. provisional patent application Ser. No. 60/384,492 filed May 31, 2002 is hereby claimed. This application is a continuation-in-part of U.S. Ser. No. 10/215,750 filed Aug. 9, 2002, the priority of which is also claimed.

FIELD OF THE INVENTION

This invention relates to a method and apparatus for distributing mass copies of text and/or images on a novel medium; namely, eggs. This invention further related to using the eggshell of the egg as an advertising or message-bearing medium. This invention further relates to a method and apparatus for imprinting images on eggs prior to sale and/or distribution to the consumer.

BACKGROUND OF THE INVENTION

Eggs are an ever-present, universally accepted staple that is found in virtually every household. The ability to mass-produce messages and/or images on the shells of the eggs represents a unique and heretofore unexploited opportunity to communicate with countless numbers of people.

SUMMARY OF THE INVENTION

As will become apparent, communicated information imprinted on the egg's shell can be, for example, the name and/or logo of the egg producer, or of the store from which the eggs are purchased, or of a third party paying to advertise on the eggshell. In addition, the name and/or flag of the country that is the source of the egg can be imprinted on the egg for political, economic or charitable identification. Other texts and/or images can be printed including, but not limited to, cartoon characters, images of famous people, recreated works of art and other such indicia, instructions, warnings, and communications pertaining to the egg or to matters other than the egg.

Because eggs are a desirable staple in virtually every country of the world, security warnings and other instructions can be readily distributed in devastated regions, disaster areas, developing countries and the like by imprinting the messages on eggs to be distributed. For the same reason, eggs may serve as an easily distributed carrier for disseminating pharmaceutical and therapeutic agents incorporated within the egg for preventive and/or recuperative medical purposes. Examples of such egg-modifying are vitamins, vaccines, medicines, dietary supplements and the like. Accordingly, it is desirable to imprint colors, images and/or text indicative of the modification, as well as pertinent instructions, directly onto the eggshell to ensure that the eggs are indelibly distinguishable from unmodified eggs regardless of whether the egg becomes separated from its packaging or passes through multiple individuals to the ultimate consumer.

Regardless of the format and application, the egg's shell is a novel and highly reliable medium for mass communication, since the shell inherently follows the edible portion of the egg throughout substantially the entire distribution chain and is visible to all who handle the egg. For convenience, all of the foregoing types of graphic and informational images and texts are hereinafter referred to as "promotional images" regardless of whether the motive for imprinting the eggs is political, commercial, informational, instructional, charitable, promotional, etc.

In accordance with the invention, eggs are preferably positioned on moving conveyor are and manipulated to position the desired region or regions of the eggshell for imprinting contact by an image-bearing tampon. Multi-color images can be produced by sequentially contacting the eggs with a plurality of tampons. Numerous other printing methods may also be employed, as hereinafter described, without departing from the spirit of the invention.

These and other features of the invention will become apparent in the following description of the preferred embodiment of which the drawings form a part.

IN THE DRAWINGS

DESCRIPTION OF THE PREFERRED EMBODIMENT

Figure 1:
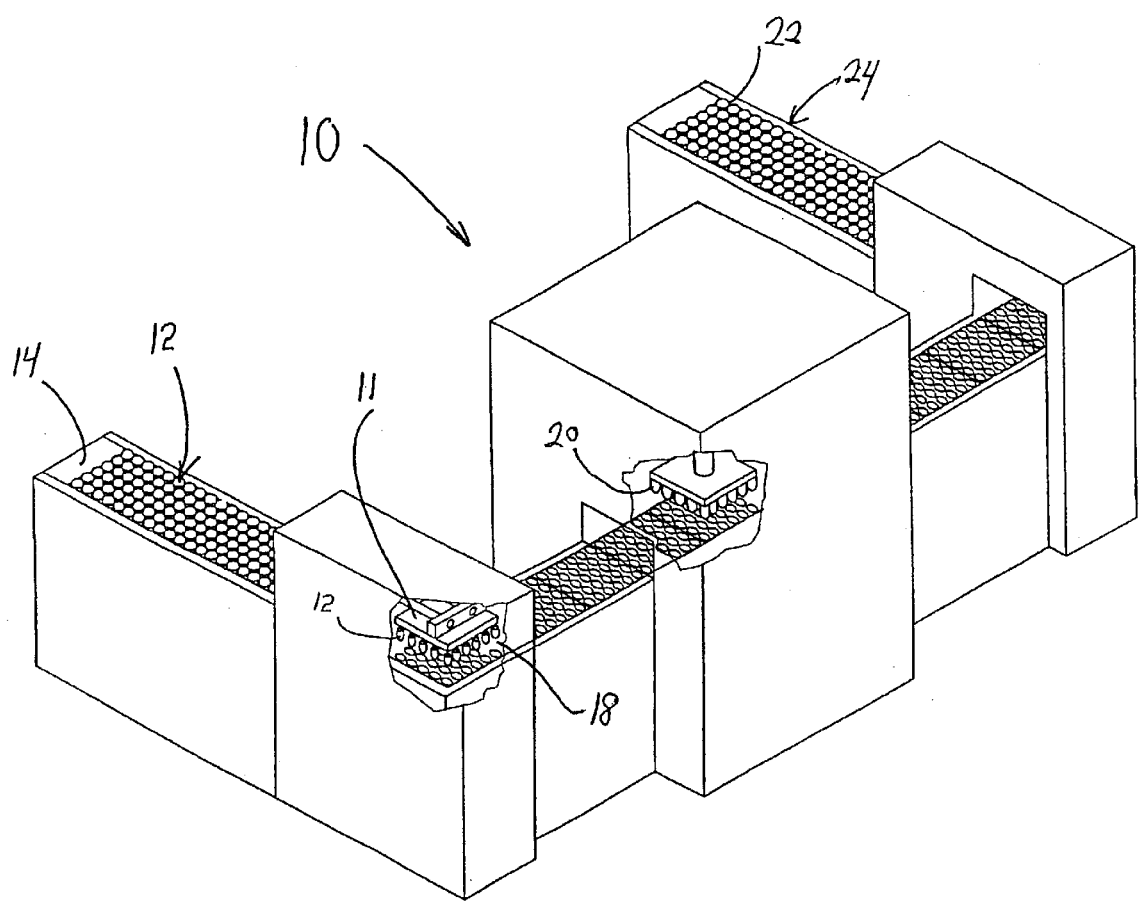
FIG. 1 is an isometric view in schematic of a machine for carrying out the process of mass producing such imprinted eggs in accordance with the invention.

Referring to FIG. 1, a machine 10 is illustrated, into which eggs 12 are transported via a conveyor 14. As will be described, the machine is preferably configured to print a full color logo or image on an egg at a preferred rate of approximately 21,000 eggs per hour, making the egg shell a novel mass-producible advertisement-bearing medium.

The machine 10 is positioned to process the eggs as they exit from the classifier (not shown) at an egg-packing facility. The classifier is a known device that separates eggs by size into one of several standard sizes: e.g., large, extra large, jumbo. Accordingly, eggs entering the machine 10 have generally equivalent diameters and curvatures.

The eggs 12 typically exit from the classifier in a series of 5×6 matrices. Each of the 30 compartments forming the 5×6 matrix is of a shape and structure similar to those of the commonly-encountered egg carton, holding the contained egg in a generally vertical orientation: i.e., with its longitudinal axis generally vertical.

As each row of 6 eggs enters the machine 10, the conveyor stops momentarily to permit each of the six eggs to be manually or automatically lifted and manipulated into position for contact by a respective tampon 20. The preferred automatic manipulation utilizes a vacuum manifold 11 having 6 vacuum heads to lift and manipulate the eggs. Each vacuum head has a plurality of orifices through which a partial vacuum is drawn so as to secure the egg against the head. Preferably, each head accommodates the top contour of the egg, so as to encircle the egg about an upper region. The orifices are evenly distributed about the circumference of the egg along said upper region so that the egg is gently secured to the head with substantially evenly distributed pressure, enabling the egg to be spatially manipulated without cracking the shell.

The six eggs in the row are then preferably simultaneously pivoted into a generally horizontal position—i.e., with their respective longitudinal axes being generally horizontal—and gently lowered into a resting position on a supporting substrate 18. A tampon device 20 then descends against the side of the egg to transfer an ink image onto the upward-facing side of the eggshell. Preferably, six tampon devices simultaneously transfer a respective image to a respective one of the six eggs. The promotional images may be text, a logo, or any other artistic or graphic representation. The images may be single color or multicolor, requiring a single tampon or a sequence of tampons to contact each egg. Further, the six images may be the same or different from each other.

The tampon obtains the image from a cliché. As is known in the printing industry, a cliché is a steel or nylon plate into which the image to be transferred has been photoengraved or otherwise etched. The cliché is then inked and cleaned with a blade, leaving the ink in the etched areas only. The tampon, itself, is a flexible silicon pad that is pressed against the cliché so as to pick up the image from the cliché for transfer to the surface being imprinted. It should be recognized, of course, that the foregoing description is illustrative only, and that other materials can be used to construct the cliché and the tampon.

The conveyor is synchronized with the printing operation. After each row of eggs is imprinted, the conveyor advances so that the next row of eggs is positioned for further processing. For example, each egg may be imprinted by a respective second tampon to yield a two-color imprint. The eggs may then be advanced to a third printing station for contact by a respective third tampon to yield a three-color imprint, etc. Those skilled in the art will recognize that the eggs may alternatively be imprinted by multiple tampons at a single printing station without departing from the spirit of the invention.

As each row of imprinted eggs advances, it eventually reaches a position within the machine wherein the eggs in the row must be manipulated once again in order to print another area of the shell or to off-load the eggs into cartons for shipment. In either case, the eggs must either be manually manipulated or manipulated by a second vacuum head. A second vacuum head is preferably identical in structure to the first, and each head engages the side of a respective egg about the region that would be the upper region if the egg was vertically oriented. The row of eggs are accordingly pivoted into a vertical orientation by the vacuum heads and placed on the supporting substrate 22 of a second conveyor 24. It should be appreciated that the first and second substrates 18, 22 may be the same if the supporting egg-surfaces thereof are configured to support both horizontally and vertically oriented eggs, in which case the conveyors 14, 24 may also be a single conveyor.

As the eggs advance, they can be printed on the other side by conveying them to another vacuum head for appropriate manipulation and stamping by a tampon. Naturally, this manipulation and stamping can be carried out by vacuum head 11 and tampon 20 prior to advancing the matrix of eggs to the next row, so long as the ink of the first image has had time to dry before placing it in contact with a support surface for the second printing operation.

After the final printing operation, the rows of eggs are manipulated into a vertical position, either manually or by the vacuum heads, and placed in egg cartons for manual or automated off-loading.

In the preferred embodiment, a tampon holder holds multiple tampons, with each tampon being sized and positioned to contact a respective egg of the row being printed. It is preferable to utilize a tampon holder holding a matrix of tampons for simultaneously imprinting a like matrix of eggs, but separate tampons or tampons capable of imprinting more than one egg at a time can be used without departing from the scope of the invention.

Figure 2:
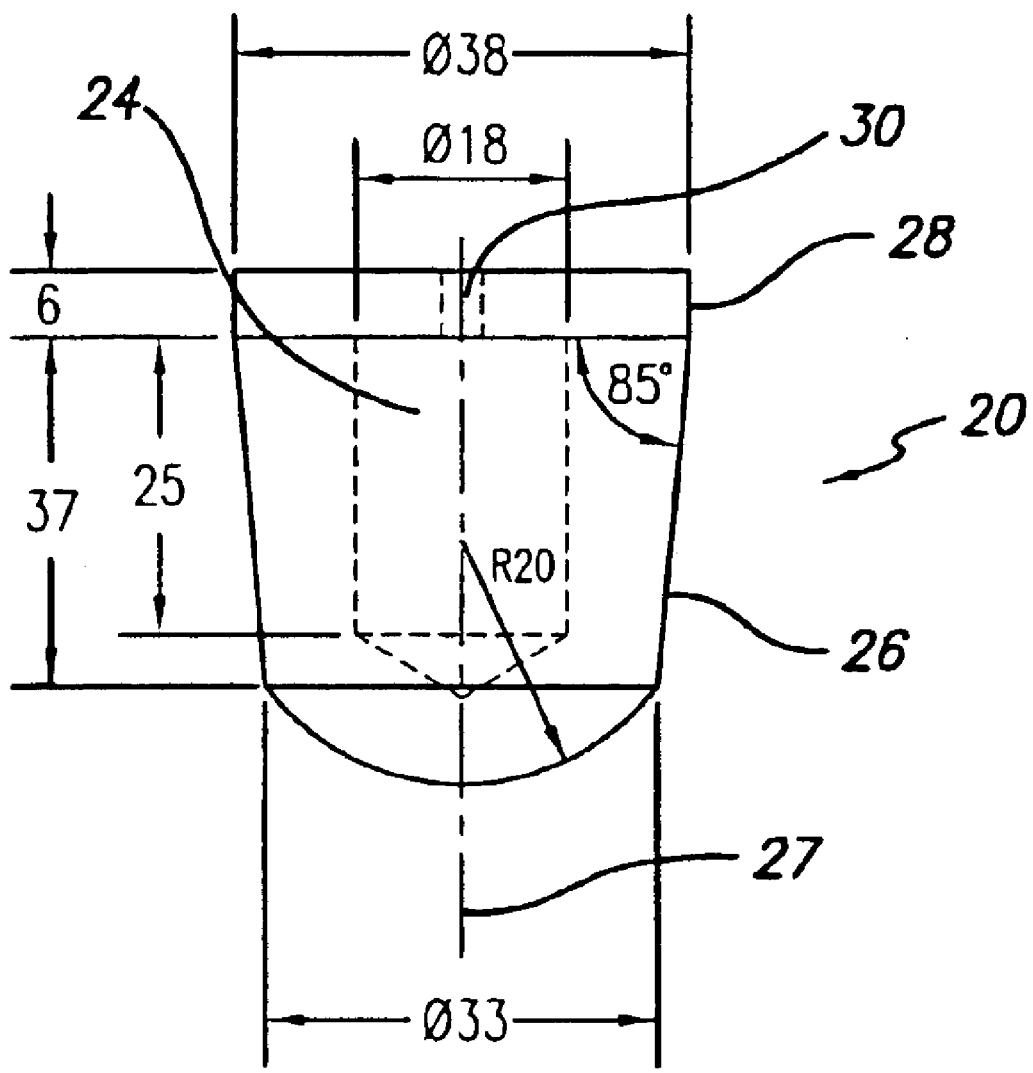
FIG. 2 is a longitudinal sectional view of a preferred tampon used by the machine in FIG. 1 in accordance with the invention.

The tampon itself is configured to soften the stamping impact on the egg. As illustrated in FIG. 2, each preferred tampon 20 comprises a generally cylindrical body 26 formed around a longitudinal axis 27 on an aluminum substrate 28. The body 26 preferably comprises 30% silicon rubber, 65% silicon oil and 5% catalyst. The body 26 preferably has a longitudinally-extending hollow central region 24, which is vented to the exterior of the body via aperture 30 in the substrate 28 to form a shock-absorbing air cell to enhance the softening of stamping impact on the eggshell. The body 26 is sufficiently pliant to conform to the contour of the eggshell for accurate reproduction of the image being printed, while sufficiently hard to accurately transfer the inked image efficiently.

The ink used for the imprinting process is a non-toxic variety of the type used to mark food products in the past. Once the ink's viscosity and color is selected, it is poured into the machine's ink container.

Figure 3:
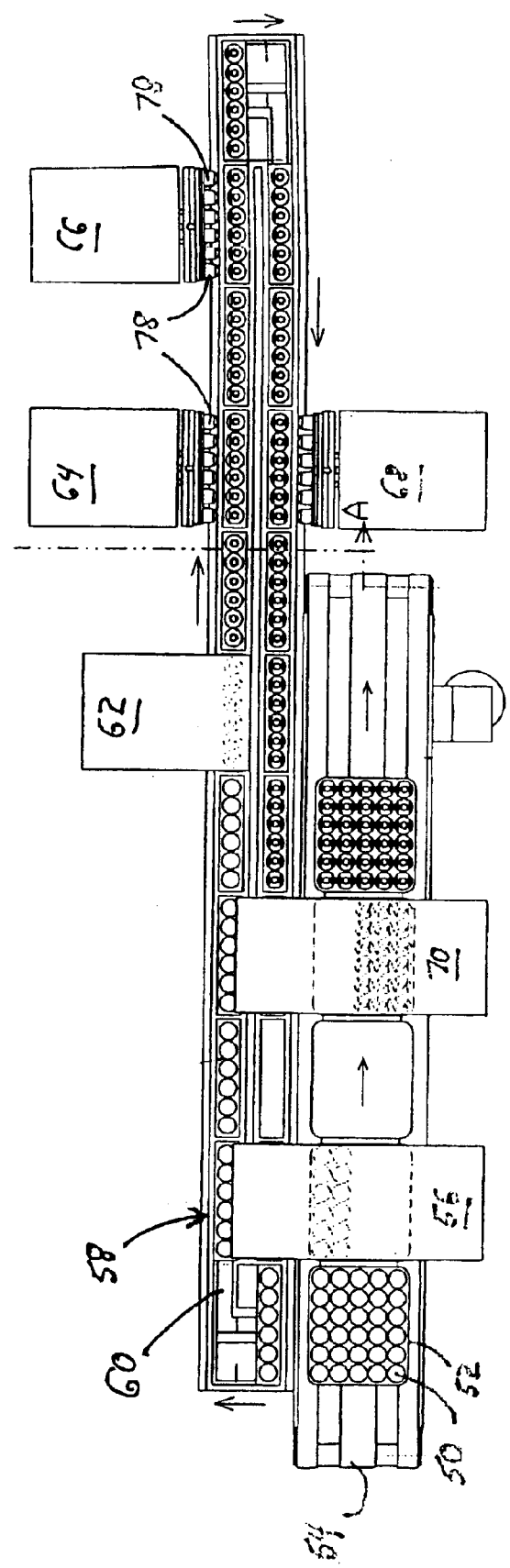
FIG. 3 is a top plan view in schematic of a preferred machine for carrying out the process of mass producing imprinted eggs in accordance with the invention.

Turning to FIG. 3, a top plan view of a preferred machine is illustrated in schematic. The eggs 50 to be imprinted are fed into the system in the conventional egg cartons 52 that are used to transport the eggs. These cartons typically arrange the eggs in a 5×6 matrix. Those skilled in the art will recognize that the eggs may later be placed in smaller cartons—typically 2×6 matrices—for retail sale of eggs by the dozen. This machine is preferably used prior to that point in the distribution chain, however, although those skilled in the art will understand that the machine herein is easily modifiable to accommodate any sized matrix.

The incoming carton 52 of eggs is placed on a loading conveyor belt 54 that is preferably operated in a stepped manner. The carton of eggs ultimately reaches a loading station 56, where the eggs are extracted row by row from the carton (i.e., in groups of six eggs) and placed within a line of respective cradles 58 affixed to a main conveyor means 60. The main conveyor means 60 comprises a conveyor belt (or a plurality of cooperative conveyor belts) that transport the eggs in an intermittent manner along a path that passes through a plurality of imprinting stations 62, 64, 66, 68 and leads to a unloading station 70, where the imprinted eggs are loaded into empty cartons traveling on the loading belt 54 downstream of the loading station 56. The portion of the loading belt 54 upstream of the loading station 56 is preferably sufficiently long to hold up to 20 cartons upstream of the loading station.

Figure 4:
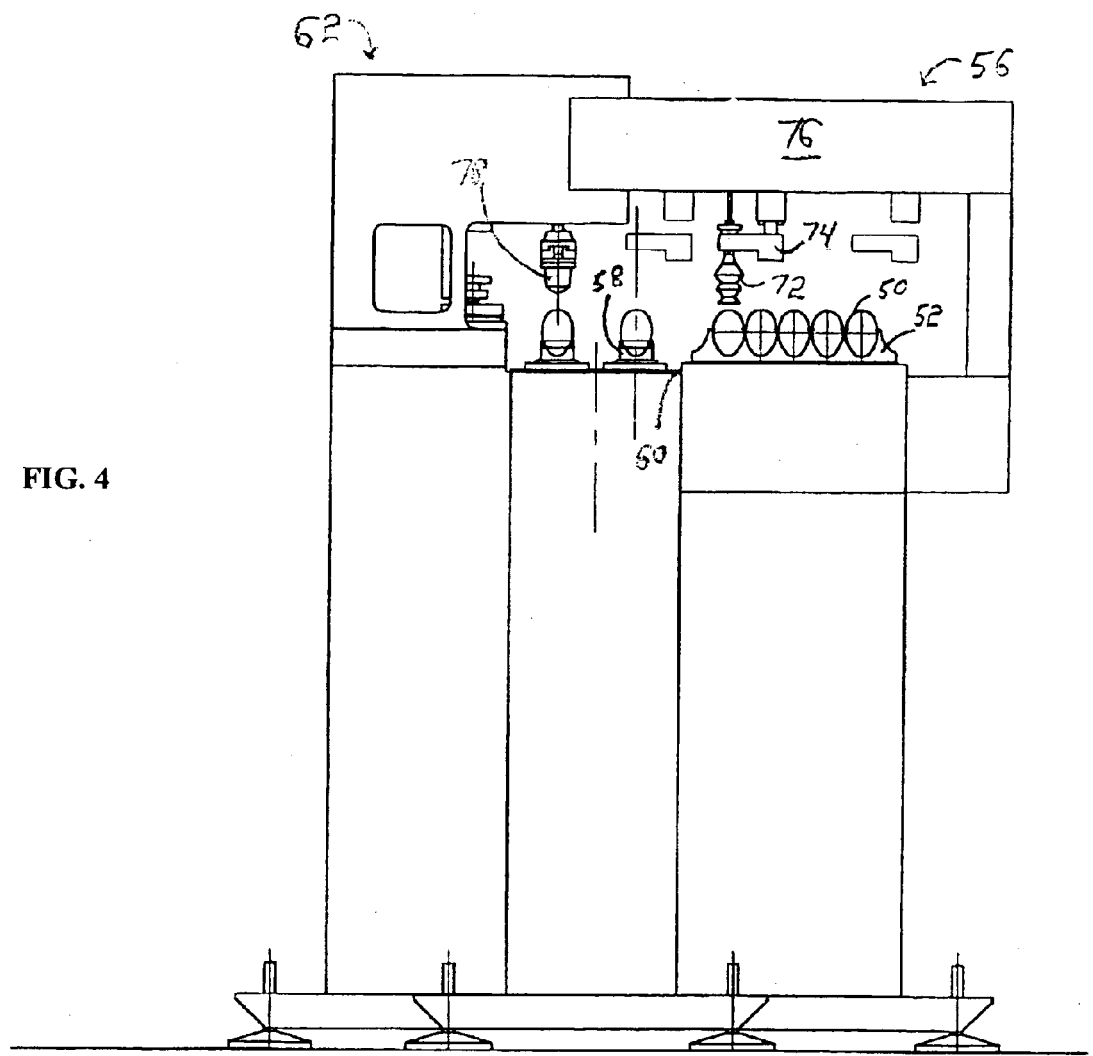
FIG. 4 is a left side view, in schematic, of the machine of FIG. 3.

The loading station is described with reference to FIG. 4, which is a left side elevation view, in schematic, of the machine of FIG. 3. A row of six vacuum heads 72, of which only the head closest to the reader is visible, depends from a manifold 74 that is supported by a carriage 76. The carriage 76 is vertically translatable so that the vacuum heads can be moved downward to contact the eggs, upward to extract them from the cartons, and downward once again to place them in cradles 58. The carriage is further configured to laterally move the row of vacuum heads between first and second positions. The first position overlies the eggs to be extracted from the carton 52. In FIG. 4, the heads are overlying the laterally innermost row of eggs 50 in the carton. The second position referred above is the position overlying the cradles 58. The first position is variable, in that the vacuum heads will return from the second position to a first position overlying the next row of eggs to be extracted from the carton 52. After a row of eggs has been deposited in the six respective cradles, the main conveyor means is advanced to bring the next set of six cradles into egg-receiving position, and then stops to allow the next row of eggs to be loaded into the new set of cradles. Consequently, as illustrated in FIG. 3, each set of cradled eggs leaving the loading station 56 moves to the left. When the conveyor is stepped again, the set is moved laterally to the rear portion of the main conveyor means, and thereafter moves in that stepped manner towards the right, passing through imprinting stations 62, 64, 66.

The vacuum heads 72 may be simultaneously activated and deactivated or may be individually activated and deactivated instead, depending on whether one wishes to accommodate cartons having different numbers of eggs in each row. Movement and activation of the vacuum heads is performed under program control to gently descend onto the eggs to be lifted, to thereafter gently and simultaneously transport the lifted row of eggs to the line of longitudinally-spaced cradles 58 on the main conveyor belt 60, to then move downward in order to place the six lifted eggs on the respective cradles, and to release the eggs before being re-positioned over the next row of eggs. The process is repeated 5 times per carton, and the loading conveyor is then stepped to bring the next egg carton 52 into position at the loading station 56. The control means may selectively activate and deactivate a pneumatic pump for the timely capture and release of the eggs by the vacuum heads, or may instead utilize a valve to selectively couple and decouple the heads from the vacuum line of a continuously running pump.

Once a row of six eggs is loaded into the cradles, the main conveyor belt 60 is repeatedly advanced one step at a time to present a new groups of six (empty) cradles to the vacuum heads. The cradled eggs are accordingly stepped towards the imprinting stations, while being held securely within their respective cradles as they are transported in order to avoid any possible movement within the cradle during the imprinting operations. The cradles are formed from a silicon rubber compound similar in composition to the body of the tampon, described above, but firmer so as to gently, but firmly, secure the cradled egg against movement during the plurality of imprinting processes and the transportation from station to station.

As illustrated in FIG. 3, the cradled eggs are transported in an intermittent manner towards the first imprinting station 62, as previously described. As illustrated in FIG. 4, the cradled eggs within the imprinting station 62 have previously moved towards the viewer from the loading station 56, laterally to the left, and away from the viewer towards the imprinting station, as previously described with respect to FIG. 3. As illustrated in FIG. 4, the first imprinting station 62 is configured to print the top of the eggs. The choice of the egg's top for the first imprinting is arbitrary, and the first station could alternatively print a selected side region of the egg instead.

Accordingly, the set of six eggs are contacted by a descending set of tampons 78 having the configuration described above, and are imprinted.

Figure 5:
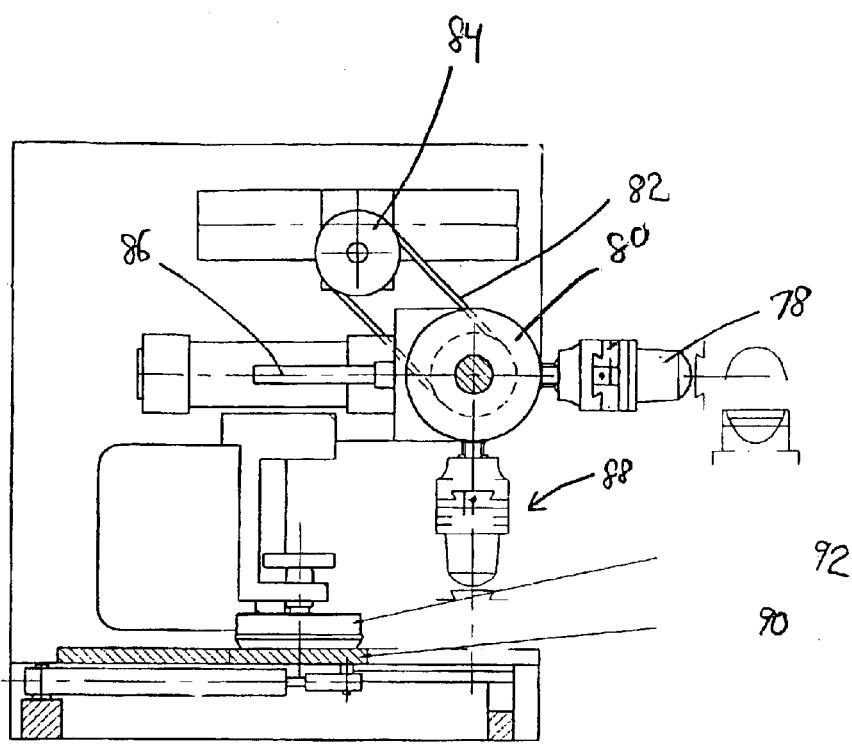
FIG. 5 is a left side view, in schematic, of the imprinting station 64 illustrated in FIG. 3.

From there, the eggs are transported, in the previously described stepped manner via the main conveyor belt means 60 towards additional imprinting stations 64, 66 which are configured to print other regions of the egg and/or the same region with additional colors for multi-color images. Imprinting stations may be provided with tampon systems of the type illustrated in FIG. 5 for the imprinting of the eggs' lateral surfaces. The tampons 78 are pivoted to and from the correct egg-contacting orientation by a belt driven pulley 80. A driving pulley 84 drives the belt 82 in response to program control. The tampons 78 are driven towards and away from the eggs under program control by a pneumatically driven piston to which they are coupled. After the tampons 78 a withdrawn from the eggs, they are pivoted downward, as illustrated at 88, translated laterally towards an inked cliché 90 with a vertically downward movement, and moved against a scraper device 92, as is known I the printing art, to remove excess ink in reparation for the next imprinting cycle.

Returning to FIG. 3, the reader will observe that, once the imprinting stage is completed on the left lateral side of the conveyor belt, the eggs cross towards the right main belt, exposing the egg's back flank towards a new battery of printing machines (e.g., imprinting station 68), and thus completing the overall imprinting of the eggs. The number of imprinting stations is determined by the number of regions of shell that must be covered as well as the number of colors to be used. Those skilled in the art will recognize, however, that each imprinting station may be utilized to imprint more than a single color or more than a single region of the shell with, however, added complexity in the mechanical configuration of the station.

As can be appreciated from FIG. 3, the eggs preferably travel in a circuit that ultimately brings them back to an off-loading station 70 after completion of the imprinting processes. In the meantime, the cartons 52 from which the eggs were removed have remained on the feeder belt 54, and are transported in a stepped manner to the off-loading station 70 to be filled with imprinted eggs by a second vacuum head arrangement similar to that at the loading station 56. The second vacuum head arrangement, takes six eggs at a time off their respective cradles, and places them in an empty row of the carton. The main conveyor is stepped, and another six eggs are so transferred. This procedure is repeated until the carton is full, and the loading belt 54 is advanced one step to position the next carton at the station 70.

Thus, it can be seen that the main conveyor belt 60 will advance five times for each single advance of the loading belt 54. With each advance of the main belt, one row of eggs (i.e., six eggs) are loaded into empty cradles, six eggs are imprinted by the tampons at imprinting station having eggs, and six eggs are off-loaded into a carton at station 70. It will be recognized that, in this embodiment, the number of eggs transferred and imprinted with each step is a function of the number of eggs in each row within the carton, while the relative timing of the belts 54, 60 is a function of the number of rows that must be transferred but that other embodiments can vary these relationships without departing from the scope of the invention. Generally speaking, one can say that, for an incoming carton having N rows of M eggs, the machine will preferably transfer a row of M eggs at a time to the cradles, and the main conveyor will be stepped N times for each advance of the loading conveyor.

While the foregoing description includes detail that will enable those skilled in the art to practice the invention, it should be recognized that the description is illustrative in nature and that many modifications and variations will be apparent to those skilled in the art having the benefit of these teachings. For example, the eggs may be loaded singly, in rows or in matrices. Imprinting may be done singly or in one- or two-dimensional matrices other than 1×6.

Moreover, it should be recognized that the invention claimed herein is the use of eggs as a mass-distributable medium for promotional and informational purposes given its virtually universal acceptance and presence in homes throughout the world. This invention is not limited to the specific manner of imprinting eggs disclosed in the preferred embodiment, but includes imprinting by any other means as well, whether by laser printing, labels affixed to the eggshells or any other means utilizing eggs as the medium. The term "imprinting" as used herein shall be taken to include all printing methods whether printing is directly onto the eggshell or indirectly as on a label or other substrate affixed to the eggshell.

It is accordingly intended that the invention herein be defined solely by the claims to be appended to the completed patent application, and that the claims be interpreted as broadly as permitted in light of the prior art.

We claim:

1. A method for labeling eggs comprising the step of imprinting mass quantities of eggs with an image including the steps of repeatedly transferring one row of eggs at a time from a carton having M rows of N eggs to N empty egg-receiving cradles until all the eggs in the carton has been transferred, moving the cradles through a number of imprinting stations, imprinting N eggs at each station with N tampons, and transferring N imprinted eggs at a time into each of the M rows in the cartons.

2. The method of claim 1 wherein the transferring step includes the steps of lifting and manipulating the N eggs with N vacuum heads.

3. The method of claim 2 including the step of drawing a partial vacuum through orifices of said vacuum heads to secure each egg against a respective head.

4. The method of claim 2 including the step of applying the partial vacuum through one or more orifices in the vacuum head so as to generally encircle the egg about an upper region whereby the egg is gently secured to the head with substantially evenly distributed pressure, enabling the egg to be spatially manipulated without cracking the shell.

5. The method of claim 4 including the step of moving the N tampons into contact against the sides of the N eggs to transfer an ink image onto the eggshells.

6. The method of claim 5 wherein the cradles are supported on a moving conveyor belt, and the conveyor is periodically stopped momentarily to permit a first set of N cradles to be loaded with respective eggs while the eggs from a second set of N cradles are unloaded into carton, and eggs held within one or more other sets of N cradles are imprinted.

* * * * *